United States Patent [19]
Sato

[11] Patent Number: 5,953,186
[45] Date of Patent: Sep. 14, 1999

[54] RECORDING MEDIUM CARTRIDGE DEVICE

[75] Inventor: Masanori Sato, Miyagi, Japan

[73] Assignee: Sony Corporation, Tokyo, Japan

[21] Appl. No.: 09/001,168

[22] Filed: Dec. 30, 1997

[30] Foreign Application Priority Data

Jan. 6, 1997 [JP] Japan ................................ 9-000375

[51] Int. Cl.$^6$ .................................................. G11B 27/10
[52] U.S. Cl. ........................................... 360/132; 360/134
[58] Field of Search ...................................... 360/132, 134

[56] References Cited

U.S. PATENT DOCUMENTS

| | | | |
|---|---|---|---|
| 4,644,433 | 2/1987 | Horikawa et al. | 260/132 |
| 4,862,305 | 8/1989 | Katagiri et al. | 360/132 |
| 5,311,030 | 5/1994 | Higuchi et al. | 360/132 X |
| 5,579,191 | 11/1996 | Alexander et al. | 360/132 |

Primary Examiner—John H. Wolff
Attorney, Agent, or Firm—Frommer Lawrence & Haug, LLP.; William S. Frommer

[57] ABSTRACT

The object of this invention is to make it possible for a light transmitting member to be easily assembled onto a cover member molded from an opaque synthetic resin, and to prevent the constitutive elements from falling even when exposed to a shock. This object is attained by providing a recording medium cartridge device including an optical detection section which is produced after a light transmitting member has been attached to a window which is formed on the front panel of a cover member, or an element, in combination with a base plate molded from an opaque synthetic resin, to form the cartridge body accommodating a recording medium. The cover member has, as integral elements, holding rib walls which run continuously along both lateral edges of the window, inner surface of front panel and a ceiling surface, and which form engaging grooves with the inner surface which are joined with both lateral edges of the light transmitting member, and elasticity retaining rib pieces placed close to the window which press the light transmitting member attached to the window inward to securely hold the latter.

9 Claims, 16 Drawing Sheets

RECORDING MEDIUM CARTRIDGE DEVICE

BACKGROUND OF THE INVENTION

1. Field of the Invention

The present invention relates to a cartridge device to contain a recording medium such as a magnetic tape, particularly to a cartridge device of a recording medium which is equipped with a position detecting mechanism to optically detect the position of the recording medium.

2. Description of Prior Art

To take an example, a record replay system such as a personal computer, an office computer or the like has a backup system connected thereto which is for recording and storing data signals. Into this backup system is placed a data cartridge containing a magnetic tape in its interior so that data signals stored in a memory of the computer body are absorbed and recorded onto the magnetic tape, or that data signals recorded on the magnetic tape are supplied to a memory of the computer body.

A data cartridge 1 to backup data, as shown in FIGS. 1 and 2, is constructed such that its cartridge body is formed by combining a base plate 2 made of a metal plate, for example, an aluminum plate, and a cover member 3 shaped into a square, shallow tray and made of a synthetic resin. Within the data cartridge 1 are placed a supply reel 4a and a take-up reel 4b which are supported by supporting shafts which are not illustrated here and put upright on the base plate 2, in such a way that the reels can freely turn round the shafts.

A magnetic tape 5 supplied from the supply reel 4a passes around a guide pin 6a put upright on one end of the front side of base plate 2, and runs along the internal surface of the front panel 3a of cover member 3, is reflected back by another guide pin 6b put upright on the other end to be wound around the take-up reel 4b. The magnetic tape 5 is supported by a still other guide pin 6c during running.

For the data cartridge 1, on the base plate 2 is put upright a support shaft 7a to which a lid body 7 is jointed in such a way as to be freely rotatable round the shaft. A record replay section 3b provided on the front panel 3a of the cover member 3 is opened and closed by this lid body 7. The record replay section 3b is opened when the data cartridge 1 is placed into a backup system, and a magnetic head on the side of the backup system invades to come into contact with the magnetic tape 5 which runs along the front panel 3a, thereby to execute recording or replaying data signals.

In addition, for the data cartridge 1, on the central part of base plate 2 is put upright a support shaft 8a to which a belt driving roller 8 is joined so as to be freely rotatable round the shaft. A part of the periphery of the belt driving roller 8 faces outward through a window 3c formed on the front panel 3a of cover member 3. When the data cartridge 1 is placed properly into the backup system, the belt driving roller 8 is put into rotation through contact with a driving roller of the backup system.

Around the belt driving roller 8 is wound an endless belt 9. The endless belt 9 not only contacts by pressure with the outer rims of the supply reel 4a and take-up reel 4b, but also passes round a pair of guide rollers 10a and 10b which are put upright on both ends of the rear side of base plate 2 such that it runs endlessly a course in the shape of a trapezoid. The belt driving roller 8 is to drive the supply reel 4a and take-up reel 4b into rotation thereby to allow the magnetic tape 5 to run.

The data cartridge 1 is provided with a false recording prevention mechanism which prevents valuable data signals from being eradicated by accident in association with new data signals being recorded on a magnetic tape 5. This false recording prevention mechanism is constituted by a false recording detection window 3d formed on one side of the front panel 3a of cover member 3, and by a false recording prevention member 11 which connects with the cover member 3 such that it can freely move back and forth between a first position where it opens the false recording detection window 3d and a second position where it closes the false recording detection window 3d.

The data cartridge 1, whenever the false recording prevention member 11 is set at the first position thereby to open the false recording detection window 3d, makes it impossible for a false recording detection means of the data backup system to detect the false recording detection window 3d. Then, the data backup system becomes ready to record data signals onto the magnetic tape 5 because no detection signal is delivered as output from the false recording detection means. Further, the data cartridge 1, whenever the false recording prevention member 11 is set at the second position thereby to close the false recording detection window 3d, makes it possible for the false recording detection means of the data backup system to detect the false recording detection window 3d. In the data backup system, through this operation, a detection signal is delivered as output from the false recording detection means to a recording control section to disable the recording of data signals onto the magnetic tape 5.

The data cartridge 1 is provided with a tape position detecting mechanism which detects a position of the magnetic tape 5, for example, its start end or its terminal end. The tape position detecting mechanism, as shown in FIG. 3, consists of a light receiving slit 2a inscribed on the base plate 2, and a reflective member 12 which is mounted on the base plate 2 as if to close the light receiving slit 2a. The reflective member 12 with a cross-section in the shape of a right-angled triangle is mounted to the base plate 2 such that one of the two sides intersecting each other to form the right angle faces a detection guide slit 2a of base plate 2 and the other faces a position detecting section 3e of cover member 3. The reflective member 12 has a piece of mirror 12a attached on the inner surface of the hypotenuse of the triangle.

When the data cartridge 1 is mounted properly to the backup system, right opposite to the light receiving slit 2a is placed a light emitting element 13 of the backup system. In addition, right opposite to the detection section 3e is placed a light receiving element 14 of the backup system. Accordingly, the data cartridge 1 is so constructed that, a detection light beam which is radiated from the light emitting element 13 and guided through the light receiving slit 2a into the interior, is reflected with a refraction by the mirror piece 12a of the reflective member 12 towards the position detecting section 3e. The detection light beam is guided through the magnetic tape 5 towards the position detecting section 3e, and penetrates this position detecting section 3e to be detected by the light receiving element 14.

Generally, the magnetic tape 5 is made impenetrable to light, but it has transparent sensing tape segments attached at its start and terminal ends. Therefore, while the magnetic tape 5 is running past the position detecting section 3e, the detection light beam is prevented from reaching the light receiving element and no detection of light results. Alternatively, when one sensing tape segment runs past the position detecting section 3e, the detection light beam penetrates this sensing tape segment to be detected by the light receiving element 14. Thus, the data cartridge 1 detects the start or terminal end of a tape.

It should be noted here that the aforementioned tape position detecting mechanism finds the running position of the magnetic tape 5 by detecting, for example, optically active position marks placed on the magnetic tape. Further, the tape position detecting mechanism also acts as a mechanism recognizing the type of data cartridge 1 by reading optically active marks placed on the magnetic tape 5 or on its sensing tape segments which may indicate the recording mode of the tape.

As described above, with this data cartridge 1, the start or terminal end, or the type of a magnetic tape is detected by the light emitting element 13 and the light receiving element 14 which are placed in the backup system such that their axes intersect each other with a right angle. With this data cartridge 1, as the detection light beam radiated from the light emitting element 13 penetrates the position detecting section 3e, at least this position detection section 3e must be made penetrable to light. Accordingly, with this data cartridge 1, generally the cover member 3 has been made of a transparent, polycarbonate resin, and the position detecting section 3e has been formed integrally with the front panel 3a.

The data cartridge 1 with such constitution poses a problem in that it allows its internal structure to be visible from outside through the transparent cover member 3. In addition, as the data cartridges 1 are generally given a uniform appearance, any given cartridge can not be easily distinguished from other same cartridges, which makes the work cumbersome involved in the orderly storage of those cartridges according to their contents. To meet these problems, these cartridges 1 are sometimes provided in a form as shown in FIG. 4: the cover member 3 is made of an opaque synthetic resin which has been conferred an appropriate color, and the light transmitting member 20 made of a transparent synthetic resin is fitted to the position detecting section 3e Namely, as shown in FIGS. 5 and 6, this data cartridge 1 has a rectangular window 15 on the front panel 3a of the opaque cover member 3 at a position corresponding to the position detecting section 3e. The cover member 3 has, on the inner side of its front panel 3e, holding rib walls 16a and 16b formed along the edges of the window 15 in the direction of height, being integral with the cover member 3. Each of the holding rib walls 16a and 16b has a cross-section in the shape of L, and is formed integrally with the front panel 3a, and hence they form engaging grooves 19a and 19b together with the inner surface of the front panel 3a, which open their mouths along the edges of window 15 in the direction of height.

The holding rib walls 16a and 16b have their respective engaging concavities 17a and 17b semicircular in profile on their surfaces opposite to the front panel 3a as shown in FIG. 8. Further, the top ends of the holding rib walls 16a and 16b are not united with a ceiling 3f as shown in FIG. 10, but form respective notches 18a and 18b there. These notches 18a and 18b, as will be described later, serve as sites by way of which, when a molding die with an undercut structure is used to form the engaging concavities 17a and 17b, the cover member 3 can be neatly removed from the molding die.

The light transmitting member 20 is made of a transparent synthetic resin, and constituted of a base section 20a, and an engaging section 20b which is formed on the back of, and integral with, the base section 20a. The base section 20a has a width sufficiently large to intercept the window 15, and a thickness nearly as large as that of the front panel 3a as shown in FIG. 5. The engaging section 20b is constituted such that, along the parts continuous with the base section 20a and at which the base section 20a has the same width with that of the engaging grooves 19, engaging convex edges 21a and 21b integral with the engaging section 20b protrude along both lateral edges. The engaging section 20b has, on the back surface of engaging convex edges 21a and 21b, engaging convexities 22a and 22b semicircular in profile which correspond in shape with the engaging concavities 17 of holding rib walls 16.

The light transmitting member 20 with above constitution is closely united with the cover member 3 after the engaging convexities 21a and 21b have been jointed with the engaging grooves 19a and 19b respectively, by being pushed upward from the lower edge as shown in FIG. 6. The light transmitting member 20 is kept being united with the cover member 3 after the engaging convexities 22a and 22b have been fitted face to face to the engaging concavities 17a and 17b respectively, as shown in FIG. 7. The light transmitting member 20 is sandwiched from above by the cover member 3 and from below by the base plate 2 after the latter two members have been assembled.

The data cartridge 1 is so constructed as to guide, as shown in FIG. 4, the detection light beam radiated from the light emitting element 13 and reflected with a refraction by the reflective member 12, through the transparent light transmitting member 20 to the light receiving element 14. For the data cartridge 1, as the cover member 3 is made of an opaque synthetic resin, its interior is not accessible to direct vision from outside. Further, with the data cartridge 1, as the engaging convexities 22a and 22b are closely fitted face to face to the engaging concavities 17a and 17b so that the light transmitting member 20 is properly placed with respect to the inner surface of front panel 3a, aberrant shift of the light axis of detection light beam is prevented and the position detection of the magnetic tape 5 is stably achieved.

Incidentally, it happens when the data cartridge 1 is dropped by accident to receive a shock or a strong inward pressure, that the light transmitting member 20 escapes from the cover member 3 in association. Namely, when a strong external force is applied, the holding rib walls 16 holding the engaging convex edges 21a and 21b bend inward to be deformed, the light transmitting member 20, because of losing its supports, falls from the cover member 3 as shown in FIG. 9.

The axis of detection light beam changes as a result of the fall of the light transmitting member 20, and hence it becomes impossible for the data cartridge 1 to detect the position of the magnetic tape 5. Further, for the data cartridge 1, such a fatal problem may happen as that the light transmitting member 20 inflicts damage on the magnetic tape 5 during falling, to make it impossible for the tape to record or replay data signals.

The aforementioned cover member 3 is formed with a molding die consisting of, as shown in FIGS. 11 and 13, a core die 23, a cavity die 24 which is tightly bound to the core die 23 with a parting surface PL as a contact surface, and a sliding die 25 which is contained in the core die 23 and slides laterally. With the molding die, as shown in FIG. 11, when the die components are tightly bound, a cavity is formed therein, and into that cavity a resin melt is injected through a gate 26 prepared on the cavity die 24 until the melt filled the cavity. After the molding die has received a predetermined cooling process, as shown in FIG. 12, the sliding die 25 is slid laterally with respect to the core die 23, and at the same time the core die 23 and cavity die 24 are subjected to a parting operation to achieve parting. The molding die, subsequent to an operation for parting the die components, is subjected to an ejection operation whereby an ejecting pin not illustrated here is put into action to eject the molded cover member 3 from the core die 23 as shown in FIG. 13.

Incidentally, the cover member 3 has, as shown in FIG. 8, the engaging concavity 17 on the inner surface of the holding rib wall 16 which opens its mouth towards the engaging groove 19 forming a closed cavity. This engaging concavity 17 is molded with a convexity 23b semicircular in profile and protruding on a part 23a of the core die 23 which is responsible for the formation of front panel 3a. As the semicircular convexity 23b protrudes normal to the direction in which the core die 23 moves for parting, the molding die of the cover member 3 has an undercut segment. Accordingly, the holding rib walls 16 are detached from the molding die through so-called "forcible removal".

In order for the molding die to allow the forcible removal of the aforementioned holding rib wall 16, on the sliding die 25 is provided a convex segment 25a which is to form the notch 18 on the holding rib wall 16. The convex segment 25a, when the die components are tightly bound together, strikes against the inner surface of the section 23a to form the front panel of cover member 3 as shown in FIG. 11. As seen from above, with the cover member 3, because the holding rib wall 16 has the notch 18 as a result of the convexity 25a of the sliding die 25, the holding rib wall 16 can have a property to bend normal to the direction in which the die is moved during removal. As shown in FIG. 13, by virtue of the existence of the notch 18, the holding rib wall 16 bends to achieve forcible detachment from the semicircular convexity 23b.

With the molding die responsible for the formation of the cover member 3, as described above, forcible removal is applied nearly to the whole length of the holding rib wall 16, and thus a resistance associated with the die removal becomes so large that the holding rib wall 16 may undergo deformation or fracture. Further, with the molding die, during forcible removal, the holding rib wall 16 is scraped to produce resin powder which is left to adhere to the cavity. Such adhered resin may cause production of failed products or breakage of the die. Furthermore, with the cover member 3, the light transmitting member 20 comes to have a holding activity variable depending on how much the holding rib wall 16 is deformed, and may fall in extreme cases.

SUMMARY OF THE INVENTION

As seen from above, this invention is proposed with an intention to provide a recording medium cartridge device which is a cover member made of an opaque synthetic resin, and a position detection section of the recording medium equipped with a light transmitting member, and wherein the light transmitting member is so firmly fixed with respect to the cover member that, even when a strong shock is applied thereto, it will not fall, and has so simple a structure as to be easily assembled.

The recording medium cartridge device of this invention which has achieved the above object is made of an opaque synthetic resin, and is constructed such that a light transmitting member is fitted to a window formed on the front panel of a cover member which, in combination with a base plate, forms a cartridge body containing a recording medium in its interior, to form a light detecting section. The cover member is integrally formed of holding rib walls and an elasticity retaining rib piece: the holding rib walls include grooves which run along both lateral edges of the window, and then continuously on the inner surface of front panel and ceiling, and those grooves, together with the inner surface of the front panel, receive both lateral edges of the light transmitting member; and the elasticity retaining rib piece holds fast the light transmitting member which is inserted therein close to the window so as to cover the window, by pressing that light transmitting member against the inner surface of the front panel.

According to the cartridge device with above features, when it is mounted properly to a main system, a light emitting element of an optical detection means to detect the position of a recording medium is placed properly with respect to the base of a base plate, and a light receiving element is properly placed with respect to the optical detection section of the cover member. With this recording medium cartridge device, a detection light beam radiated from the light emitting element is reflected with a refraction by a reflective member placed on the base plate to be guided towards the recording medium and then it passes through a light transmitting member to be received by a light receiving element mounted on the front panel of cover member so that the position or the type of the recording medium can be detected.

With this recording medium cartridge, the light transmitting member is united with the cover member after its both lateral edges are joined with engaging grooves formed between holding rib walls formed on the cover member and the inner surface of front panel. The light transmitting member, while being joined with the cover member, is held fast after the principal joint surface is pressed forward against the inner surface of front panel by an elasticity retaining rib piece. The holding rib wall, because of being continuous with the inner surface of front panel and ceiling, will not bend even when it receives a shock but will hold firmly the light transmitting member so that it may not fall. The elasticity retaining rib piece presses the light transmitting member against the inner surface of the front panel of cover member, or a reference surface, thereby maintaining the alignment.

DESCRIPTION OF THE PREFERRED EMBODIMENTS

The preferred embodiments of this invention will be detailed below with respect to attached figures. The recording medium cartridge of following embodiments as illustrated in the figures are the same with a data cartridge 1 which is, when use, mounted to a backup system which has been connected to a personal computer or an office computer to record/store data signals. The data cartridge 1 is to record/store data signals accumulated in the memory of a computer body onto a magnetic tape 5, or to supply data signals recorded on a magnetic tape 5 through the backup system to the memory of the computer body.

Figure 15:
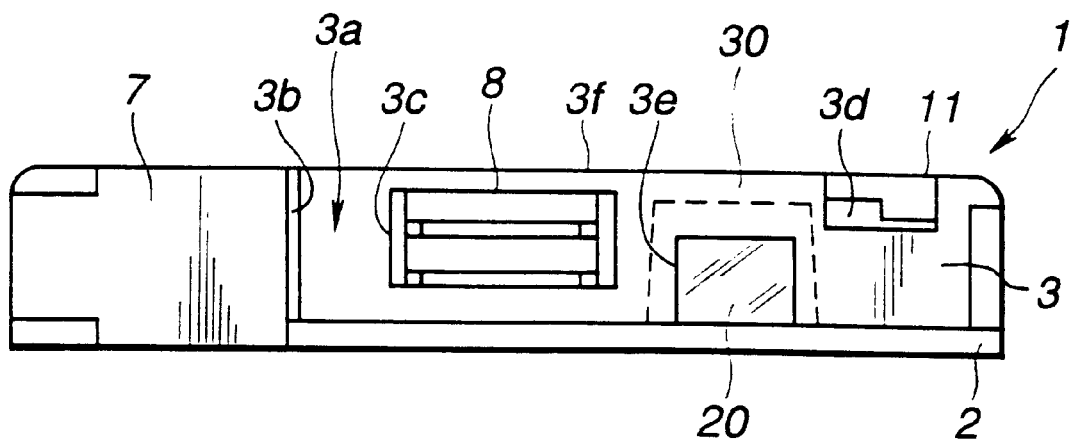
FIG. 15 is a frontal view of the same data cartridge.

The tape cartridge 1, as shown in FIG. 15, is produced after a base plate 2 and a cover member 3 has been combined to form a cartridge body generally in the form of a flat box. The cover member 3 is produced after an opaque synthetic resin colored as appropriate has been molded to take the shape of a square, shallow tray with the bottom open. The base plate 2 is made of a light metal plate such as aluminum plate or aluminum alloy plate, and is fitted to the opened bottom of the cover member 3. These base plate 2 and cover member 3 are combined together into a unit after screws have been screwed into studs not illustrated here and studs protruding on the inner surface of cover member 3 have been fitted to corresponding holes formed on the base plate 2.

The tape cartridge 1, as shown in FIG. 15, is provided with a record replay section 3b on the front panel 3a of cover member 3 which is opened and closed by a lid body 7, a window 3c facing towards a belt driving roller 8, and a false recording detecting window 3d which is opened and closed by a false recording preventing member 11. Further, the tape cartridge 1 is provided with another window 15 on the front panel 3a of cover member 3, and this window 15 is constructed so as to form a tape position detecting section 3e in combination with a light transmitting member 20 described later. The light transmitting member 20 is made of, for example, a transparent polycarbonate resin and forms a transparent optical detection section on one part of the front panel 3a of cover member 3.

The tape cartridge 1 contains, though not illustrated here, a supply reel and a take-up reel which are supported by supporting shafts extending upright from the base plate 2 such that they can freely turn round the shafts. A magnetic tape 5 supplied from the supply reel is guided by a plurality of guide members prepared on the base plate so that the tape can run along the internal surface of the front panel 3a of cover member 3, to be wound up by the take-up reel. The tape cartridge 1 contains a tape driving mechanism which drives the supply and take-up reels so as to put the magnetic tape 5 into running.

The tape driving mechanism consists of a belt driving roller 8, an endless belt not illustrated here, and a plurality of guide members to guide the endless belt. The belt driving roller 8 takes the form of a step roller which has large and small diameter sections and is made of an elastic material such as rubber. This belt driving roller 8, when the driving roller of a backup system entering through the window 3c is pressed against the large-sized section, puts that roller into rotation. The endless driving belt is wound around the small-sized section of the belt driving roller 8 and around belt guide rollers placed on both ends of the rear edge of base plate 2.

With this tape driving mechanism, when the belt driving roller 8 is put into rotation, the endless belt runs a course in the shape of a trapezoid within the tape cartridge 1 keeping the magnetic tape 5, under a specified tension, in contact with the outer rims of supply and take-up reels. Through this operation, the tape driving mechanism drives the supply and take-up reels into rotation, thereby running the magnetic tape 5.

The data cartridge 1 is provided with an optical detection mechanism which recognizes the start or terminal end of the magnetic tape 5, or an optically active mark indicating the recording type of the tape and inscribed on a part thereof. This optical detection mechanism consists of a light receiving slit (not illustrated here) inscribed on the base plate 2, and a reflective member (not illustrated here) mounted on the base plate so as to intercept the light receiving slit. The reflective member is made of, for example, a transparent polycarbonate resin, and is molded to give a cross-section of a right-angled triangle to whose inclined surface is applied by adhesion a reflective material such as a thin strip of silver.

When the data cartridge 1 is mounted properly to the backup system, right opposite to the light receiving slit is placed a light emitting element of the backup system. In addition, right opposite to the tape position detection section 3e is placed a light receiving element 14. The light detecting mechanism allows a detection light beam radiated from the light emitting element to enter through the light receiving slit into the interior of the cartridge body. The detection light beam is incident upon a reflective member, to be reflected therefrom with a refraction towards the front panel 3a to hit upon the magnetic tape 5 running along the internal surface of front panel 3a.

The detection light beam, while the magnetic tape 5 is running past the tape position detecting section 3e, is intercepted by this running magnetic tape 5 and hence can not reach the tape position detecting section 3e. However, the detection light beam, while a transparent leader segment or a recognition mark runs past the tape position detecting section 3e, penetrates it to reach the tape position detecting section 3e. As the optical detection mechanism has the tape position detecting section 3e made of a transparent material as described above, the detection light beam passes through the tape position detecting section 3e outward to be received by the light receiving element 14.

The backup system detects the running position of the magnetic tape 5 from the detection output delivered by the light receiving element, or recognize the type of the magnetic tape 5. Depending on the detection output from the light receiving element 14, the backup system, for example, stops the rotation of the driving roller, or recognizes the recording type of the magnetic tape 5. Accordingly, the data cartridge 1, when the magnetic tape 5 is driven to a position close to the start or terminal end, is automatically inactivated to stop. Incidentally, the fundamental composition and operation of the aforementioned data cartridge 1 is the same with that of a conventional data cartridge.

Figure 1:
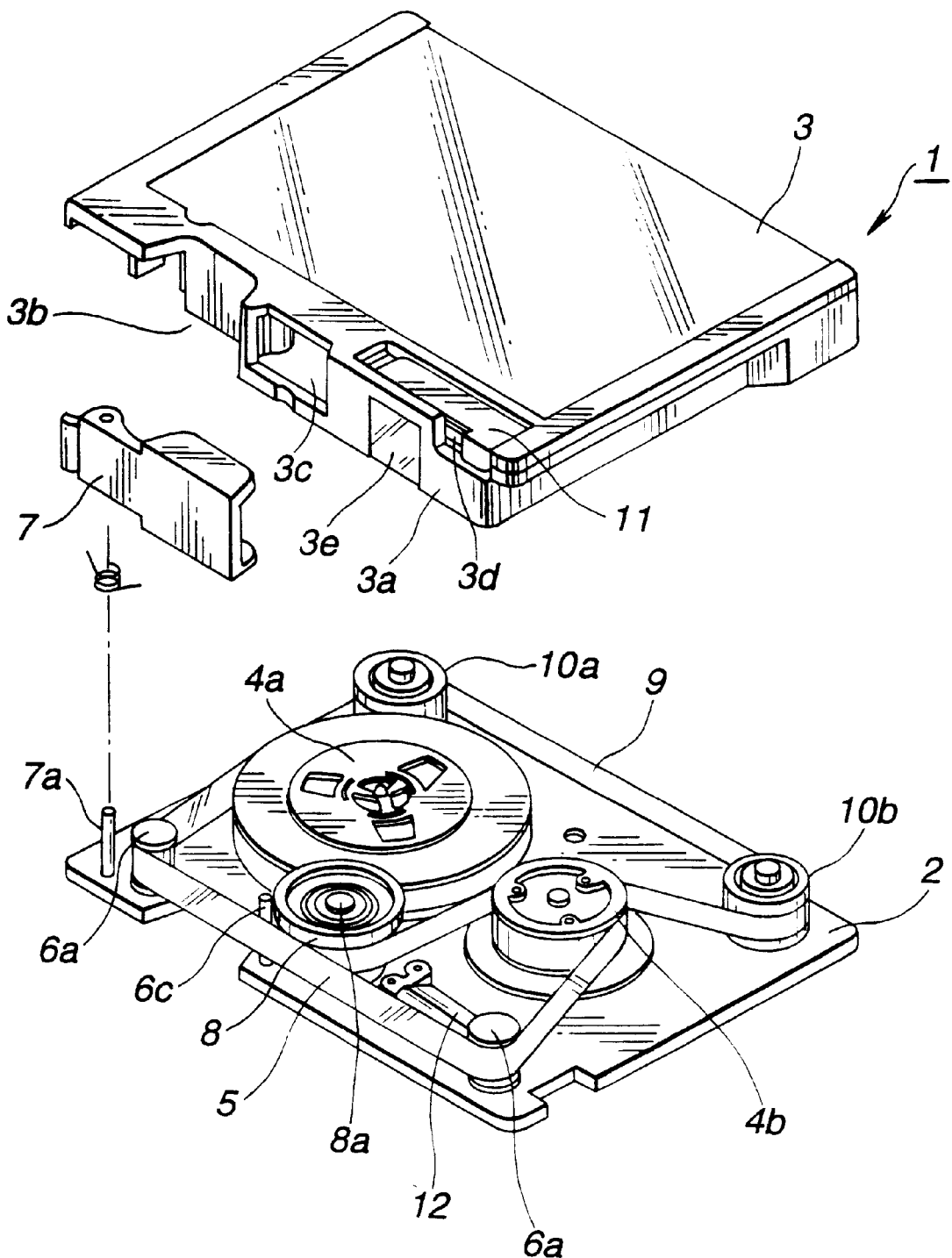
FIG. 1 is a disintegrated, perspective view of a conventional data cartridge.
Figure 2:
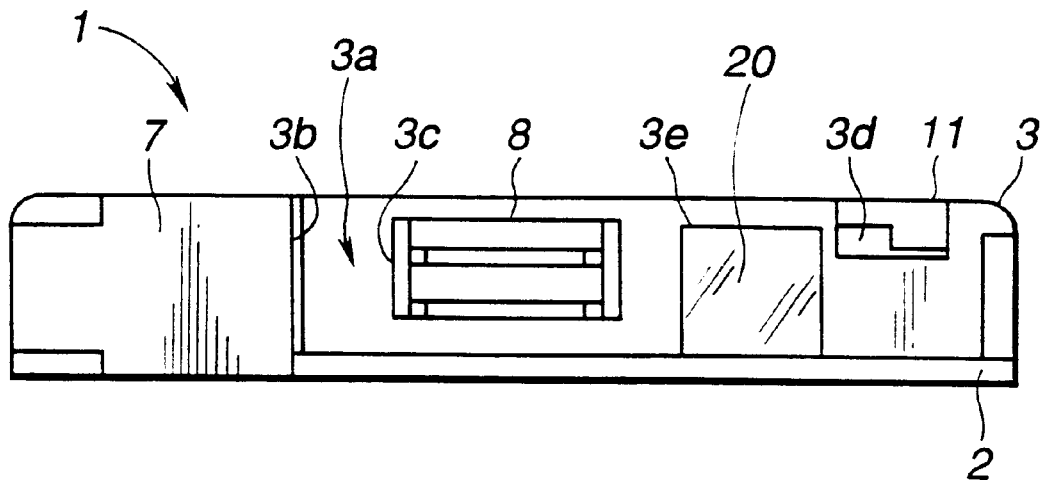
FIG. 2 is a frontal view of the same data cartridge.
Figure 3:
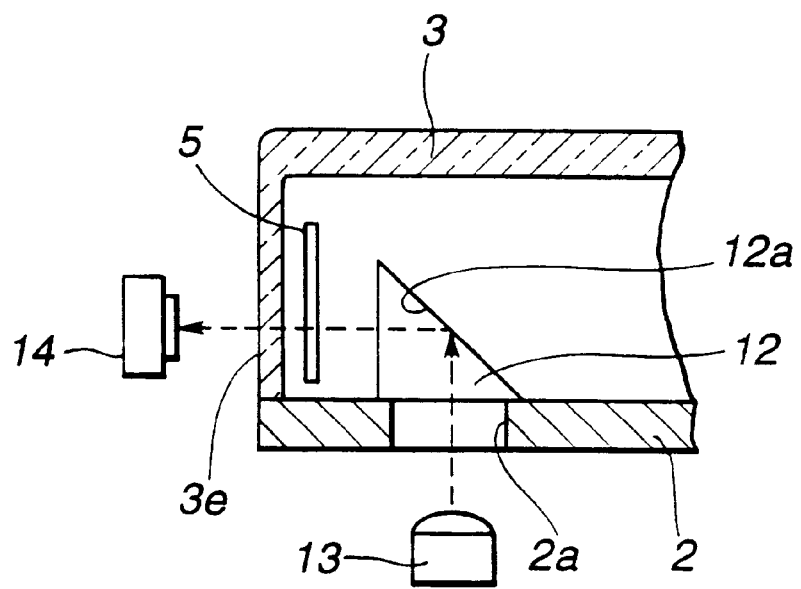
FIG. 3 illustrates the constitution of a tape position detecting section provided to the same data cartridge.
Figure 4:
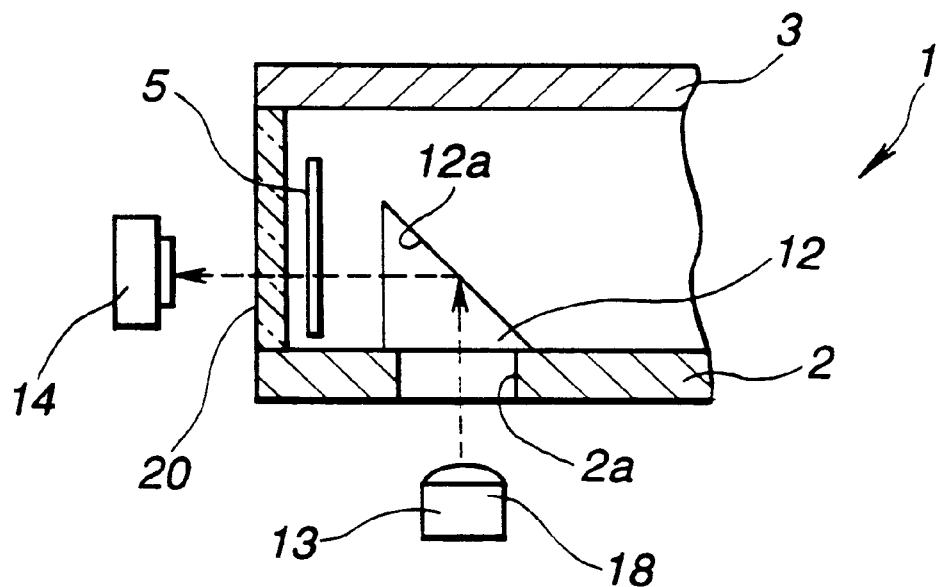
FIG. 4 illustrates the constitution of another tape position detecting section provided to the same data cartridge.
Figure 5:
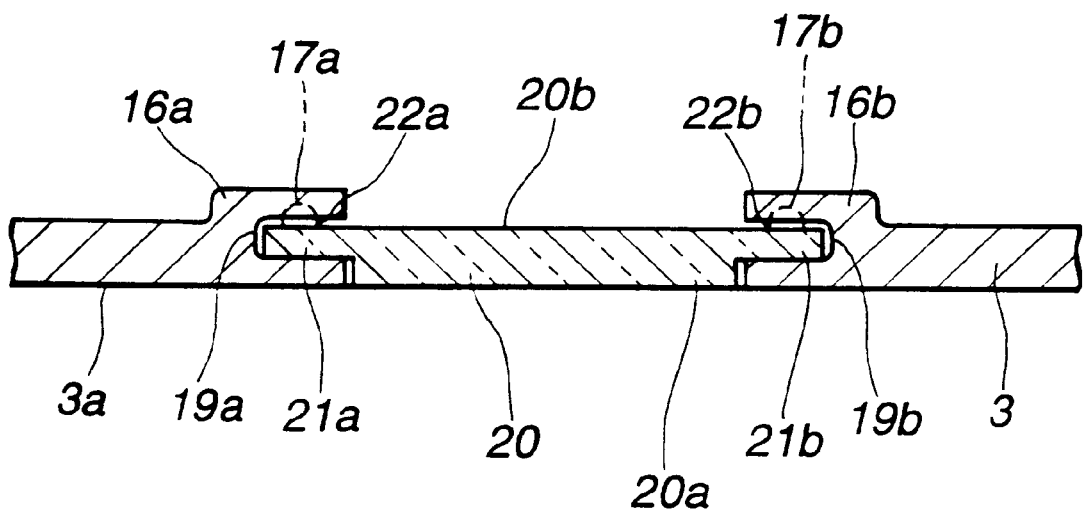
FIG. 5 is a horizontal cross-section of the same tape position detecting section to illustrate the constitution thereof.
Figure 6:
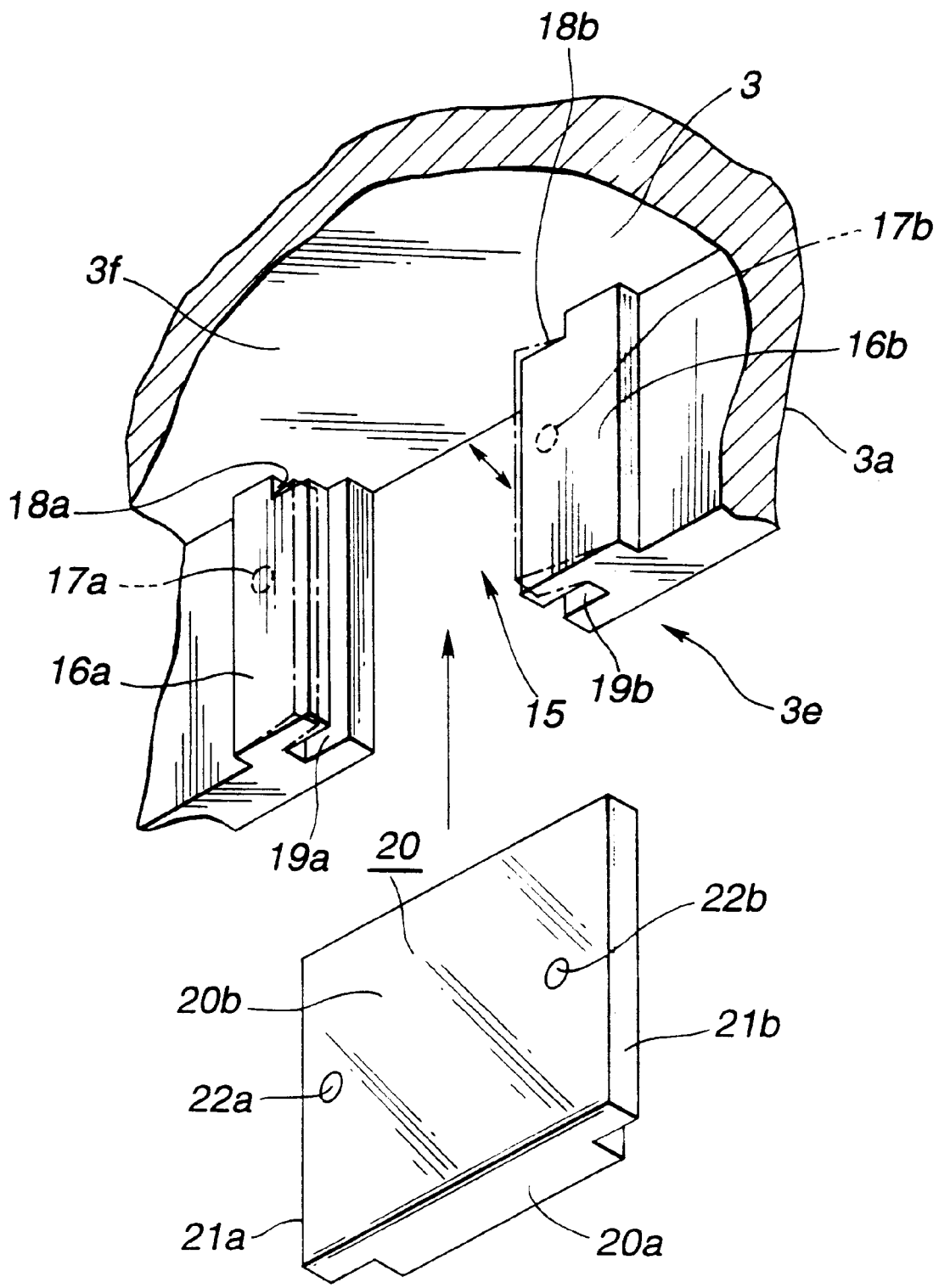
FIG. 6 is a disintegrated, perspective view of the same tape position detecting section to illustrate the constitution thereof.
Figure 7:
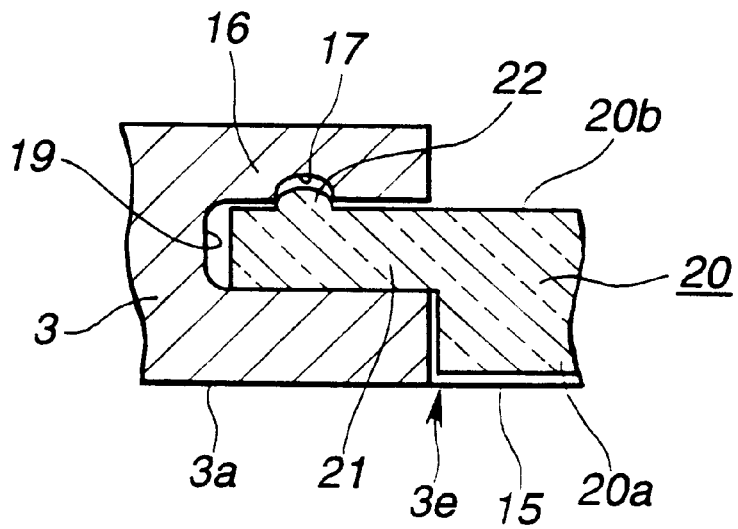
FIG. 7 is an enlarged cross-section of parts of interest of the same tape position detecting section to illustrate the detailed constitution thereof.
Figure 8:
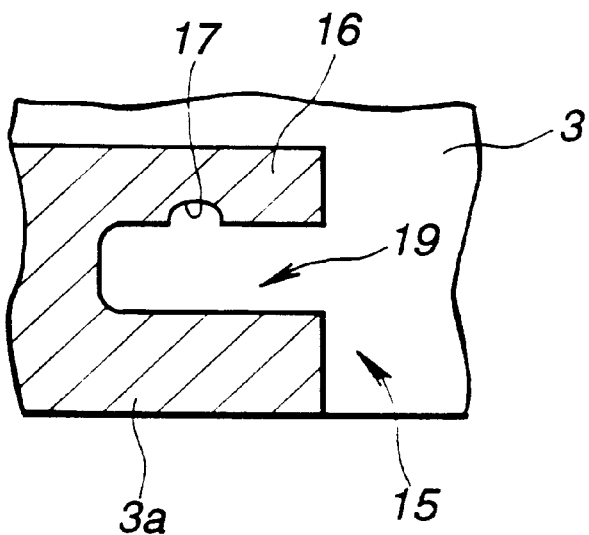
FIG. 8 is a horizontal cross-section of parts of interest of a cover member constituting the same tape position detecting section.
Figure 9:
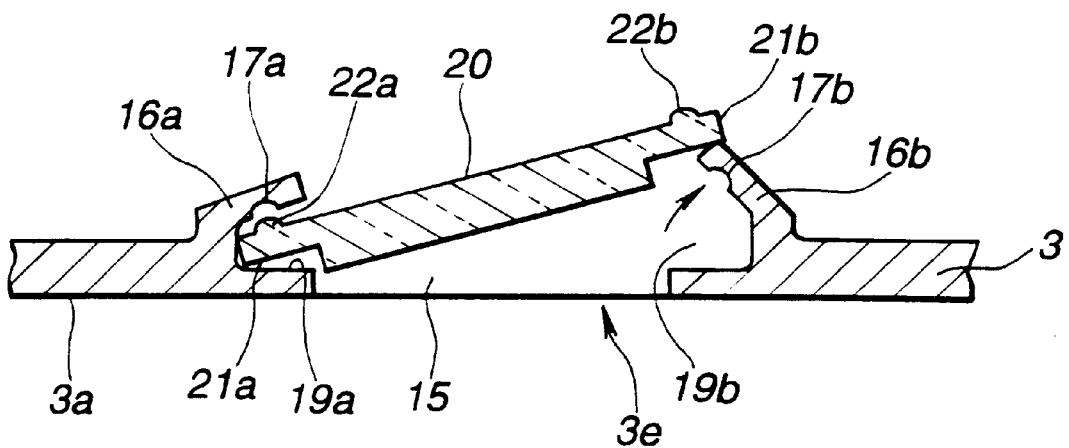
FIG. 9 is a horizontal cross-section of parts of interest of the cover member constituting the tape position detecting section, to illustrate how a light transmitting member falls in the presence of a shock.
Figure 10:
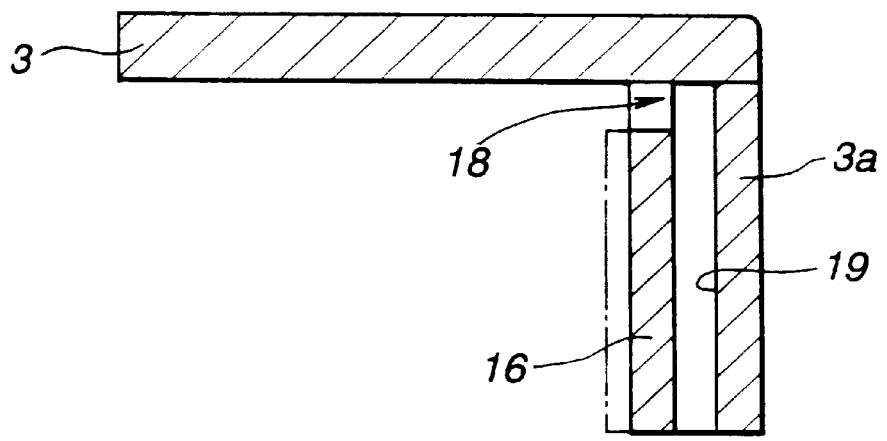
FIG. 10 is a longitudinal cross-section of parts of interest of the cover member which are involved in the fall of the light transmitting member.
Figure 11:
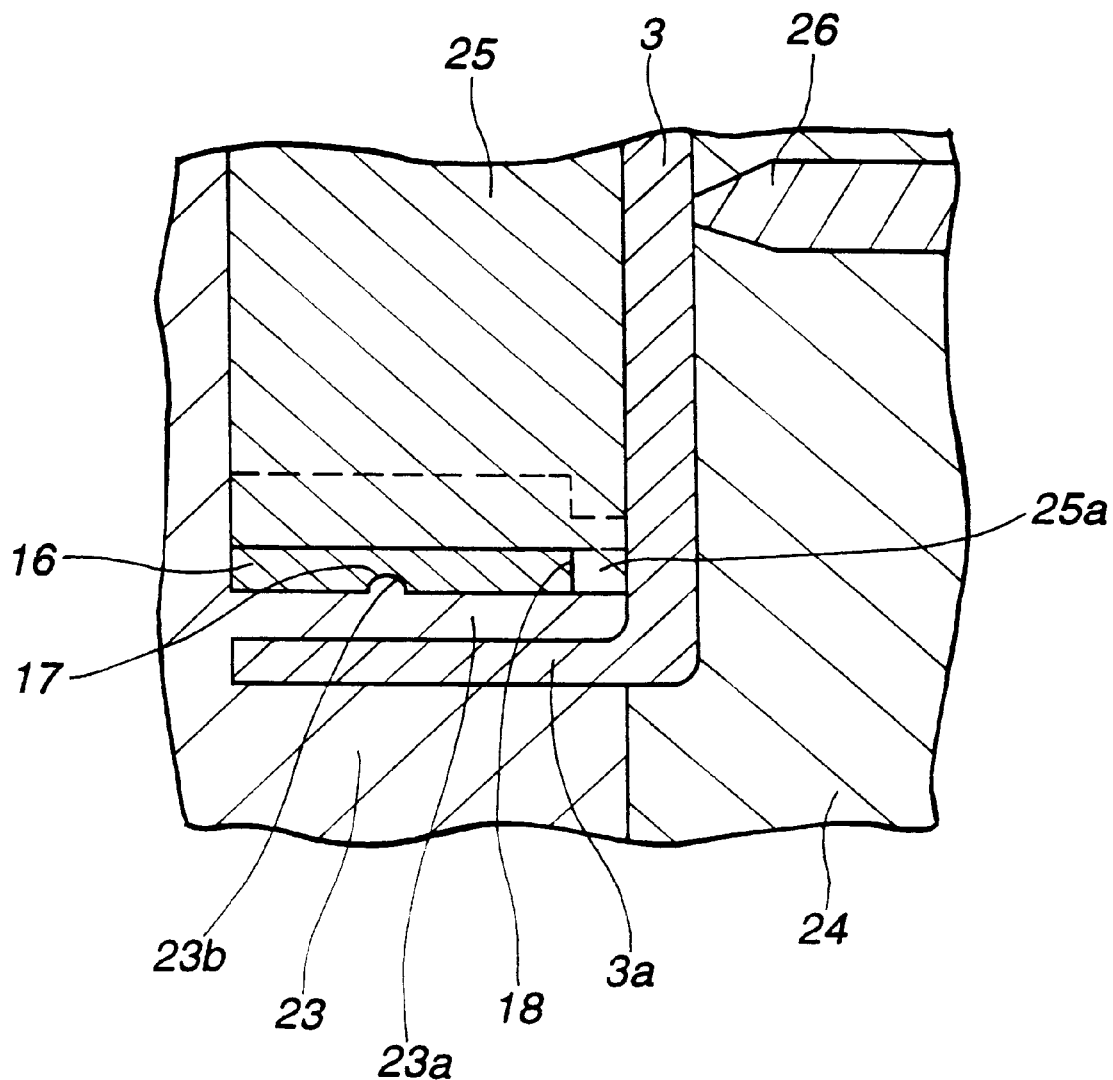
FIG. 11 is a cross-section of parts of interest of a molding die which molds the cover member constituting the same tape position detecting section, and of which component dies are tightly bound together for molding.
Figure 12:
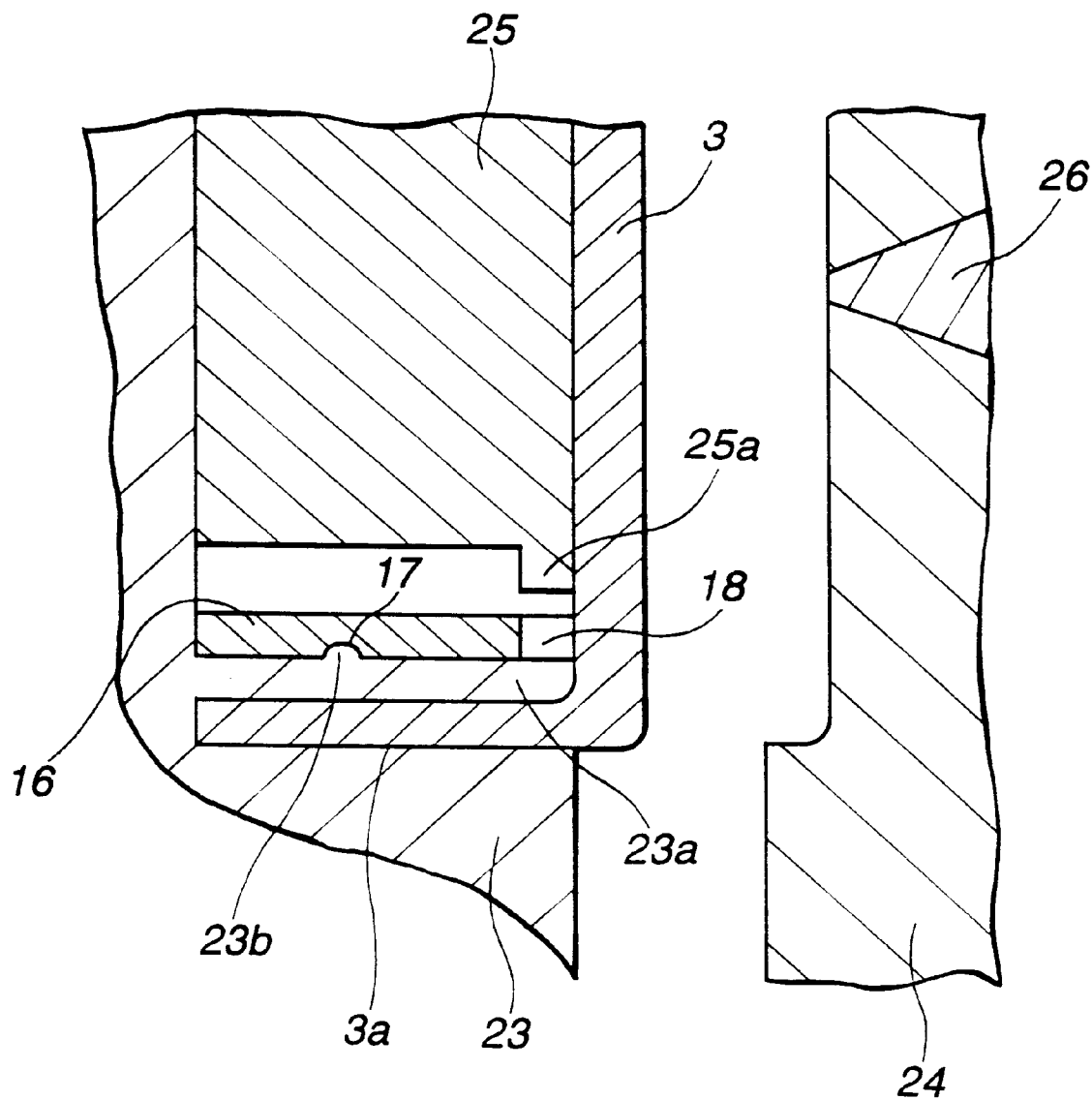
FIG. 12 is a cross-section of parts of interest of the molding die which molds the cover member constituting the same tape position detecting section, and of which component dies are disintegrated.
Figure 13:
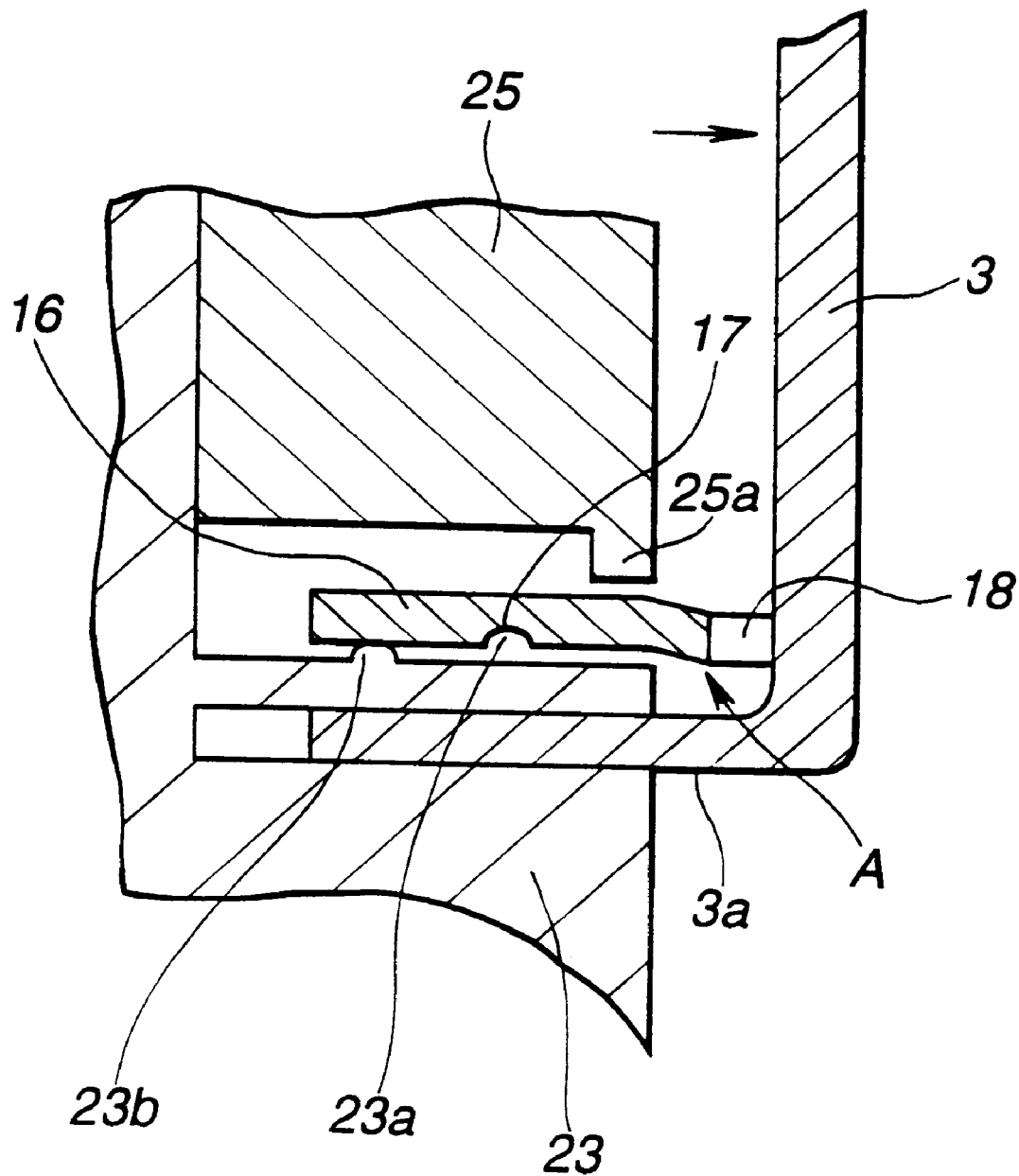
FIG. 13 is a cross-section of parts of interest of the molding die which molds the cover member constituting the same tape position detecting section, to illustrate how the mold is ejected.
Figure 14:
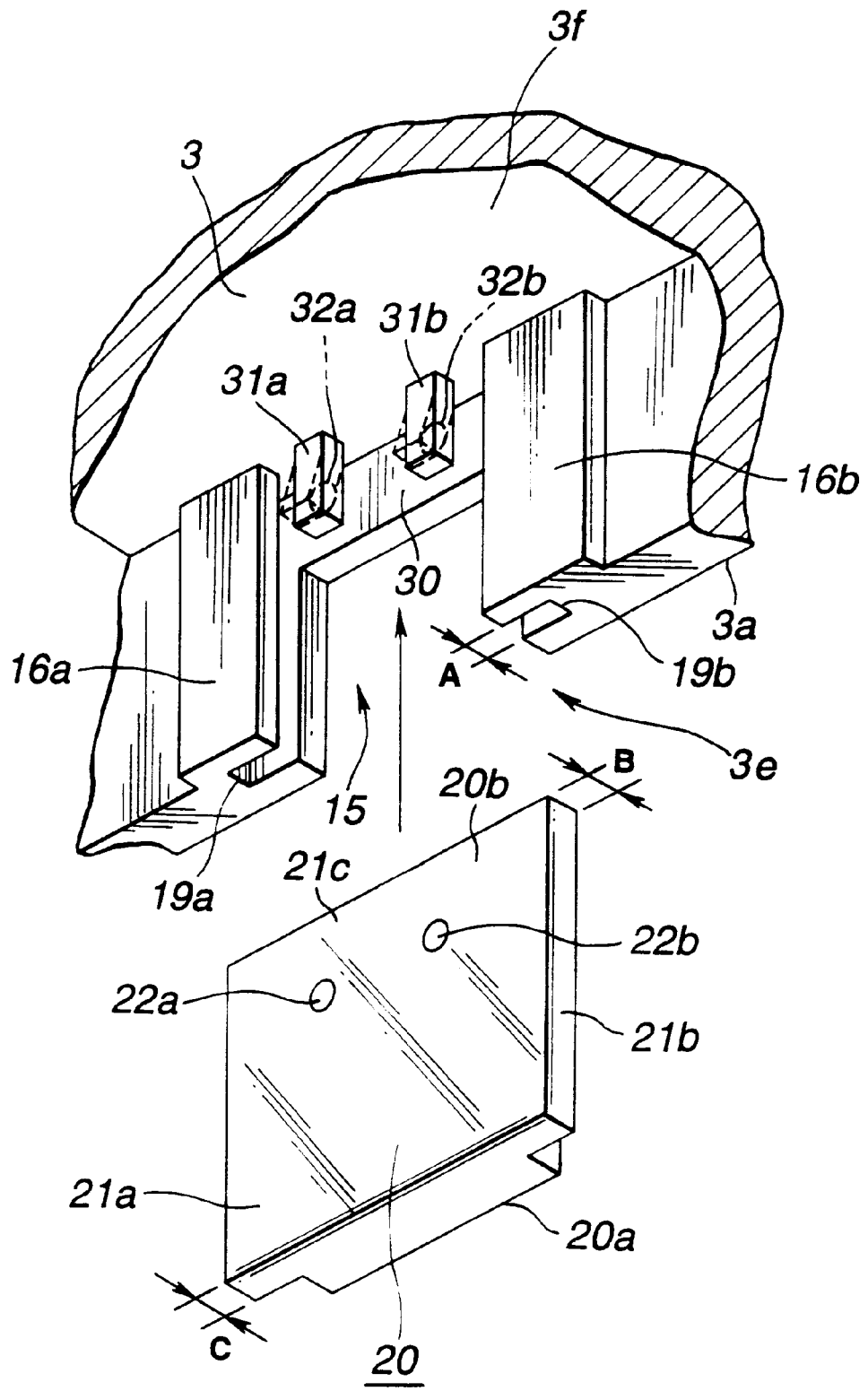
FIG. 14 is a disintegrated, perspective view of parts of interest of a tape position detecting section provided to a data cartridge shown as an embodiment of this invention, to illustrate the constitution thereof.
Figure 16:
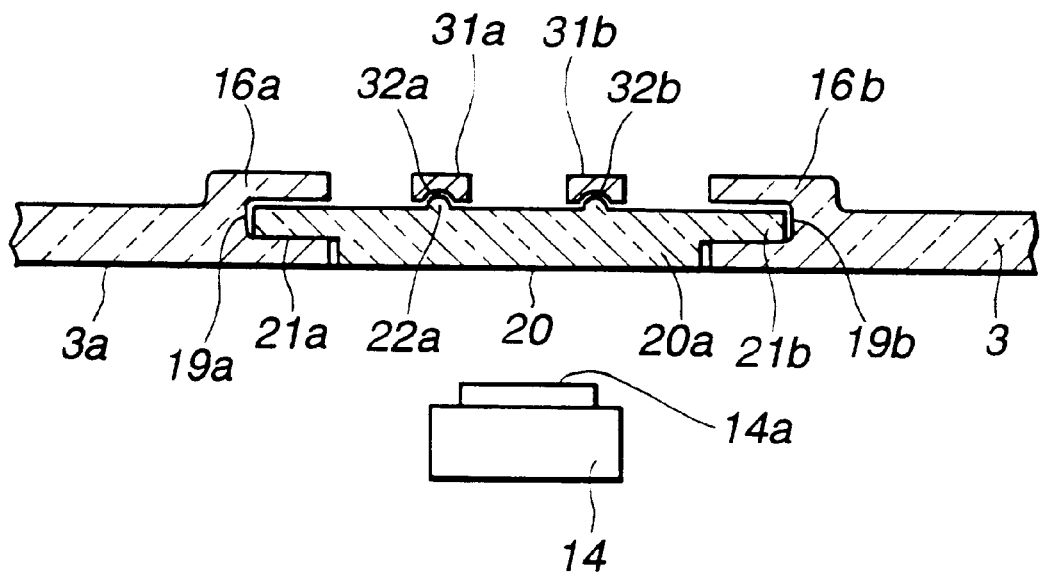
FIG. 16 is a horizontal cross-section of the tape position detecting section prepared on the front panel of the same data cartridge
Figure 17:
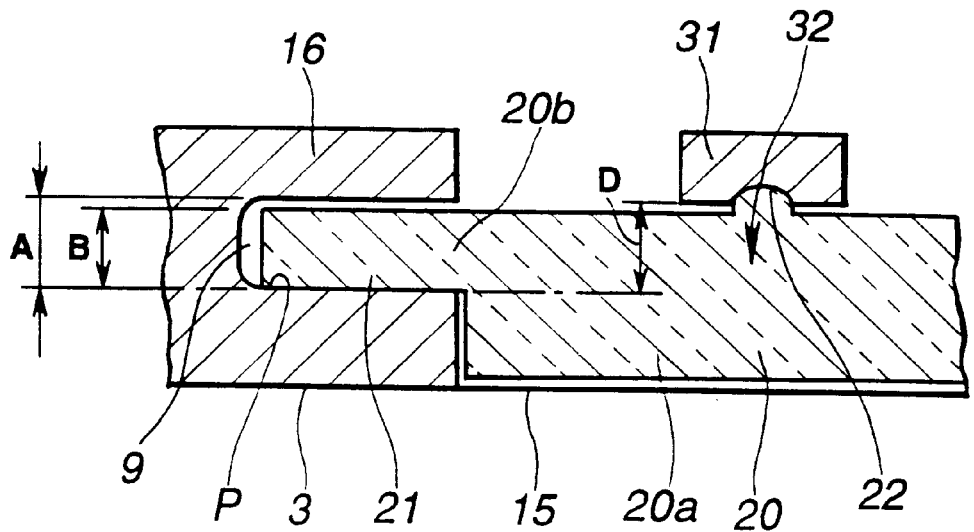
FIG. 17 is an enlarged cross-section of parts of interest of the same position detecting section, to illustrate the detailed constitution thereof.

With the data cartridge 1, a light transmitting member 20 constituting the aforementioned optical detection mechanism is mounted to the cover member 3 through elements as depicted in FIGS. 14, 16 and 17. The cover member 3 has a window 15 opened on its front panel 3a corresponding in position with the tape position detecting section 3e as described above. As shown in FIG. 14, the window 15 takes a form of a rectangular opening with a connecting wall section 30 being inserted between the window top and ceiling 3f of the cover member 3 and the bottom continuous with the lowest end of the front panel 3a of cover member 3 being open.

A pair of holding rib walls 16a and 16b are formed integrally with the cover member 3, on the inner surface of the front panel 3a along the lateral edges of the window 15. For these holding rib wall 16a and 16b, as shown in FIG. 16, their basic ends protrude from the cover member 3 in the direction of thickness, and are bent such that they become parallel to the inner surface of cover member 3. Thus, they form L-shaped protrusions projecting from, but being continuous with, the front panel 3a. These holding rib walls 16a and 16b have their terminal ends nearly flush with the lateral edges of the window 15. In addition, with the holding rib walls 16a and 16b, as shown in FIG. 14, their -upper ends are continuous with the inner surface of the ceiling 3f of cover member 3.

Namely, the holding rib walls 16a and 16b are integrally molded with the cover member 3: one end of them in the direction of height is continuous with the inner surface of front panel 3a, and another end in the direction of thickness is continuous with the ceiling 3f of cover member. Accordingly, as the holding rib walls 16a and 16b are so constructed as to maintain a strong resistance against deformations in the direction of thickness, they will scarcely undergo bending even if an external force is applied by way of the light transmitting member 20 described later which may arise when, for example, the data cartridge 1 is dropped by accident.

Figure 18:
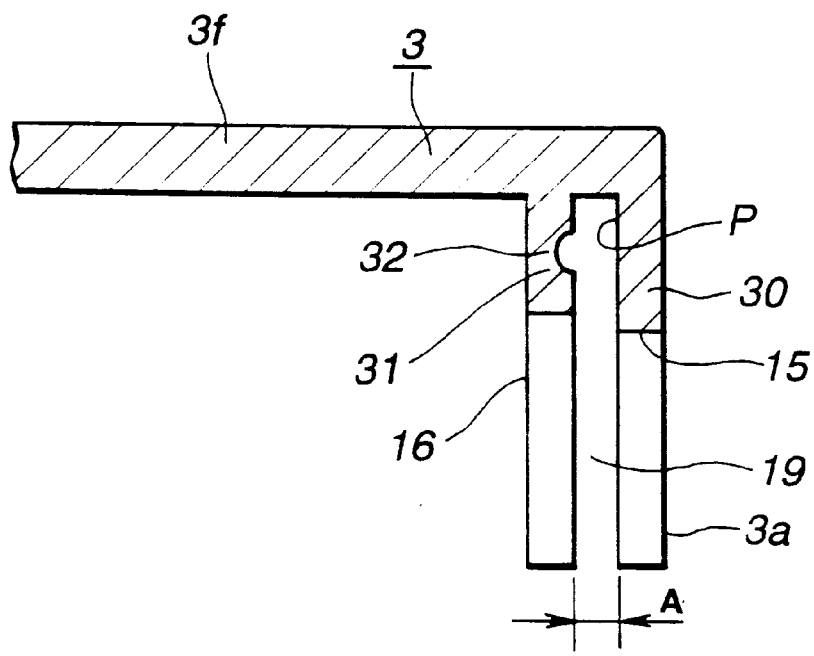
FIG. 18 is a cross-section of parts of interest of the tape position detecting section of the cover member, to illustrate the constitution thereof.

With the cover member 3, as shown in FIGS. 14 and 18, cavities formed in the direction of height between the inner surface of front panel 3a and the holding rib walls 16a and 16b act as engaging grooves 19a and 19b to joint with the light transmitting member 20 described later, to hold the latter. With these engaging grooves 19a and 19b, as will be described later, their width A is slightly larger than the widths B and C of engaging convexities 21a and 21b formed on both lateral edges of the light transmitting member 20. Further, the inner surface P of front panel 3a which forms parts of the engaging grooves 19a and 19b has such a high precision flat surface that it acts as a reference surface in the anteroposterior direction of a light transmitting member 20 to be attached thereto.

With the cover member 3, as shown in FIGS. 14 and 18, a pair of elasticity retaining rib pieces 31a and 31b protrude integrally from the inner surface of the ceiling 3f right above the window 15. The elasticity retaining rib pieces 31a and 31b consist of convex pieces rectangular in profile and placed in parallel to the connecting wall section 30 left on the front panel 3a. They have nearly the same height with the connecting wall section 30, and their front surface is nearly flush with the front surface of holding rib walls 16a and 16b. Further, the elasticity retaining rib pieces 31a and 31b can undergo elastic deformation in the direction of thickness, depending on the property of a material thereof. These elasticity retaining rib pieces 31a and 31b have engaging concavities 32a and 32b semicircular in profile inscribed on their front surface as shown in FIG. 17. To these engaging concavities 32a and 32b are fitted face to face the engaging convexities 22a and 22b, respectively.

The elasticity retaining rib pieces 31a and 31b is, to be more precise, so constructed as to make the interval D between their front surface and the inner surface of connecting wall section 30 slightly smaller than the groove width A of the engaging grooves 19a and 19b. Accordingly, when the light transmitting member 20 is joined with the cover member 3 as will be described later, the elasticity retaining rib pieces 31a and 31b receive an inwardly directing elastic deformation which acts as a source to generate a force to push the light transmitting member 20 forward. The elasticity retaining rib pieces 31a and 31b, by undergoing an elastic deformation, exerts a forward pressure of 0 g/cm$^2$ to 500 g/cm$^2$ to the light transmitting member 20.

Further, the elasticity retaining holding rib pieces 31a and 31b, in addition to be given a specified mechanical strength and a thickness sufficient to produce a forward pressure as described above, is so constructed as to have a thickness sufficiently adjusted not to interfere with the running of the magnetic tape 5 which runs past the inner surface of the front panel 3a. The elasticity retaining rib pieces 31a and 31b are preferably designed, so, as to have a thickness of 0.2 mm to 1.5 mm.

The light transmitting member 20 is made, as described above, of a material such as a transparent polycarbonate resin or the like, and consists of a base section 20a, and an engaging section 20b integrally formed with the back of the former. The base section 20a, as shown in FIG. 16, provides a rectangular appearance sufficiently large to completely cover the window 15, and has a thickness nearly the same with that of the front panel 3a of cover member 3. The base section 20a forms a light transmitting section to transmit the detection light beam which is radiated from the light emitting element and reflected with a refraction by the reflective member 12.

Figure 19:
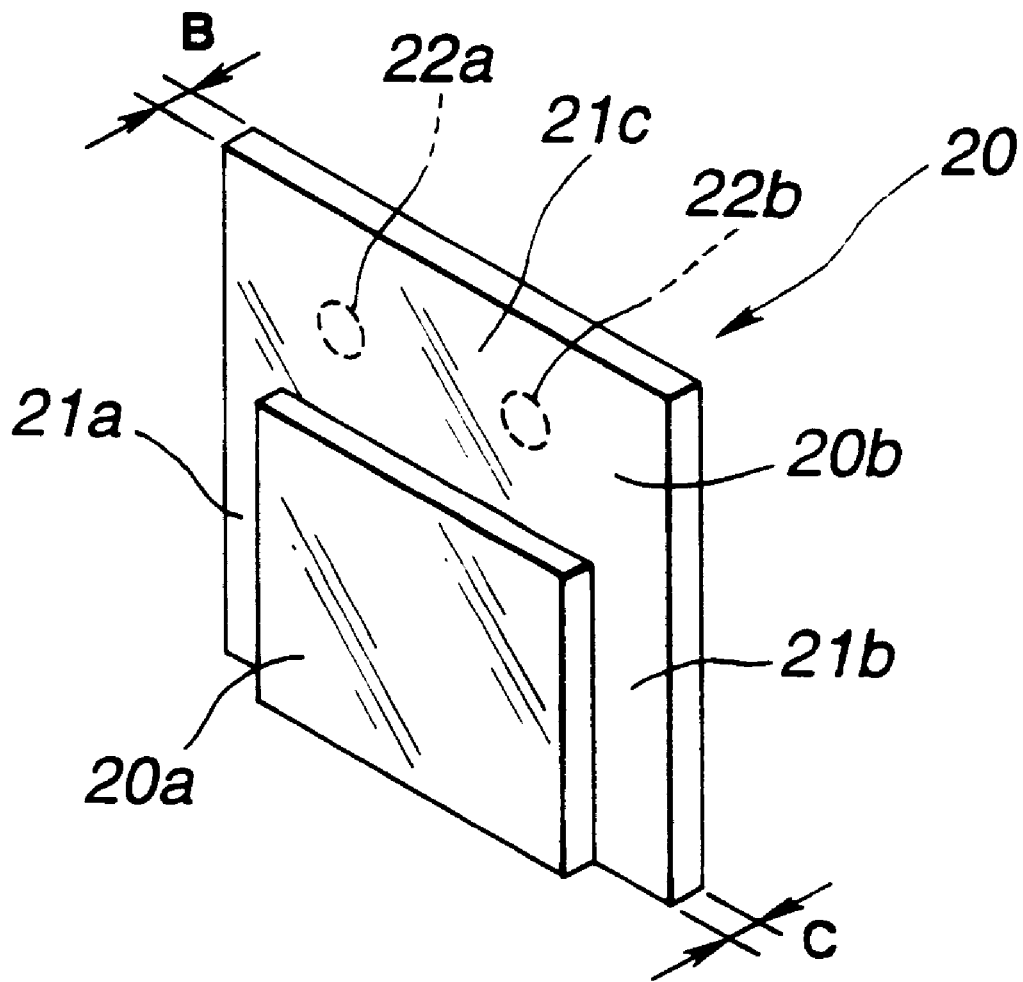
FIG. 19 is a perspective view of a light transmitting member which is provided to the cover member to constitute the tape position detecting section.

The engaging section 20b, as shown in FIG. 19, is formed integrally with the base section 20a as a protrusion around its three sides except for the bottom side, and forms engaging convexities 21a to 21c which protrude from the left and right sides and top side of the base section 20a. Of the engaging section 20b, the lateral protrusions have a length in excess of the base section 20a nearly the same with the depth of engaging grooves 19a and 19b, and the top protrusion has a length in excess of the base section 20a nearly the same with the height of the connecting wall section 30. With the engaging section 20b, as shown in FIGS. 14 and 19, the thickness of top protrusion B is slightly smaller than the thickness C of the lower edge.

Accordingly, the engaging section 20b has such a tapered structure as to allow its thickness to be increasingly enlarged in the direction of insertion into the engaging grooves 19a and 19b. To put it otherwise, the light transmitting member 20, being so constructed as to allow its thickness to vary in accordance with insertion, is structurally modified as if to be equipped with an insertion guide which is useful when the light transmitting member 20 is attached to the cover member 3. Then, with the cover member 3 and light transmitting member 20, as described above, the width A of engaging grooves 19a and 19b, and the thickness B of the top protrusion, and the thickness C of the lower edge of the engaging section 20, and the interval D between the elasticity retaining rib piece 31 and the reference surface P are so designed as to meet relations, A≧C>B, A>D, and B≧D.

With the light transmitting member 20, a pair of engaging convexities 22a and 22b with a space in the direction of width in between are allowed to protrude from, and integrally with, the principal surface of engaging section 20. These engaging convexities 22a and 22b are so constructed as to fit face to face to the engaging concavities 32a and 32b formed on the inner surface of the aforementioned elasticity retaining rib pieces 31a and 31b, respectively. When the light transmitting member 20 is joined with the cover member 3, these engaging convexities 22a and 22b fit face to face to the engaging concavities 32a and 32b respectively, thereby to maintain the connection.

The as formed light transmitting member 20 is pushed upward from beneath the front panel 3a as indicated by an arrow in FIG. 14, and then the left and right engaging protrusions 21a and 21b of engaging section 20b are inserted through the engaging grooves 19a and 19b respectively, to achieve a joint with the cover member 3. With the light transmitting member 20, as described above, the engaging section 20b has a tapered structure which allows its thickness to vary in the direction of insertion, and thus both left and right engaging protrusions 21a and 21b smoothly connect with the engaging grooves 19a and 19b.

The light transmitting member 20 is inserted until the top engaging protrusion 21c reaches the elasticity retaining rib pieces 31a and 31b, and then it is further inserted into the cover member 3 having these elasticity retaining rib pieces 31a and 31b undergo an inward elasticity displacement. When the light transmitting member 20 is inserted until the top engaging protrusion 21c has reached the inner surface of ceiling 3f, the engaging convexities 22a and 22b formed on the engaging section 20a fit face to face to the engaging concavities 32a and 32b formed on the elasticity retaining rib pieces 31a and 31b, respectively. As the elasticity retaining rib pieces 31a and 31b retain a slightly stronger elasticity displaced state than being left untouched as stated above, they apply a specified elastic force upon the light transmitting member 20.

With the light transmitting member 20, the elastic force generated by the elasticity retaining rib pieces 31a and 31b not only maintains the connection between the engaging convexities 32a and 32b and engaging concavities 22a and 22b, but also pushes this connection towards the front panel 3a. With the light transmitting member 20, as shown in FIGS. 16 and 17, the left and right engaging protrusions 21a and 21c are pressed by the elastic force from the elasticity retaining rib pieces 31a and 31b against the reference surface P or a surface forming parts of engaging grooves 19a and 19b on the front panel 3a, to achieve an alignment in the anteroposterior direction. With the light transmitting member 20, as shown in FIG. 16, the principal surface of the base section 20a becomes parallel to the light receiving surface 14a of the light receiving element 14, and thus the detection light beam suffers no aberration in the direction of its axis, and the position of a tape is stably detected.

With the data cartridge 1 with the features as described above, as the parts of holding rib walls 16a and 16b which form the engaging grooves 19a and 19b runs continuously around the inner surface of the front panel 3a of cover member 3 and the inner surface of ceiling 3f, the holding rib walls 16a and 16b can maintain a sufficient mechanical strength. Accordingly, even when the data cartridge 1 receives a shock during a fall, the holding rib walls 16a and 16b will undergo no bending deformation, and thus the light transmitting member 20 attached to the window 15 will be safely prevented from falling.

Further, with the data cartridge 1, as the light transmitting member 20 attached to the window 15 is pressed against the inner surface of the front panel 3a which also acts as a reference surface P, in the presence of an elastic force generated by the elasticity retaining rib pieces 31a and 31b, alignment of the member in question with respect to the light receiving surface 14a of the light receiving element 14 is securely achieved.

Furthermore, with the data cartridge 1, as the engaging convexities 21a and 21b of light transmitting member 20 to connect with the grooves 19a and 19b have a tapered structure in the direction of insertion, attachment of the light transmitting member 20 to the cover member 3 can be achieved easily. Still further, with this data cartridge 1, no assembly error will arise that may cause the engaging convexities 21a and 21b to get stuck midway while they are inserted through the engaging grooves 19a and 19b in order to attach the light transmitting member 20 to the cover member 3.

Figure 20:
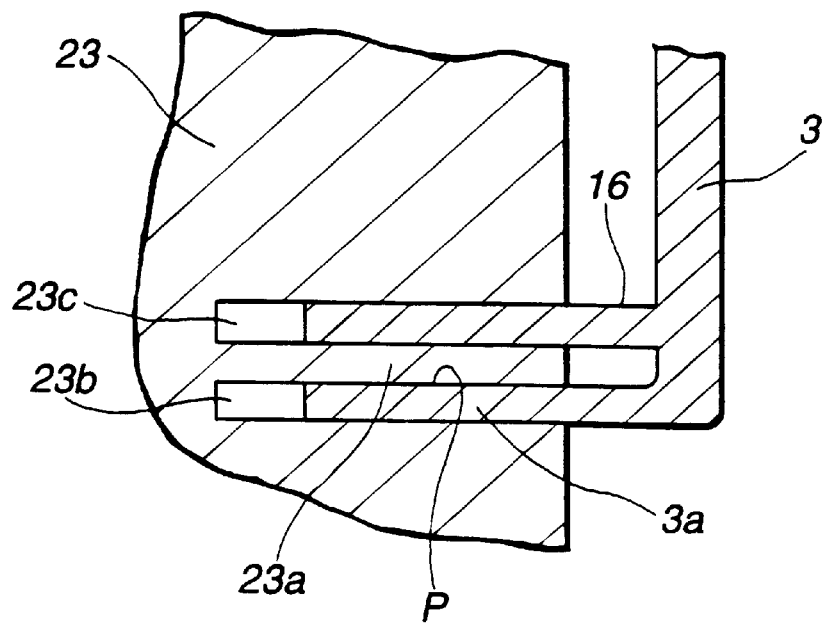
FIG. 20 is to illustrate how a mold is ejected from a molding die responsible for the formation of the cover member, and also forms a cross-section of a holding rib wall of the cover member.
Figure 21:
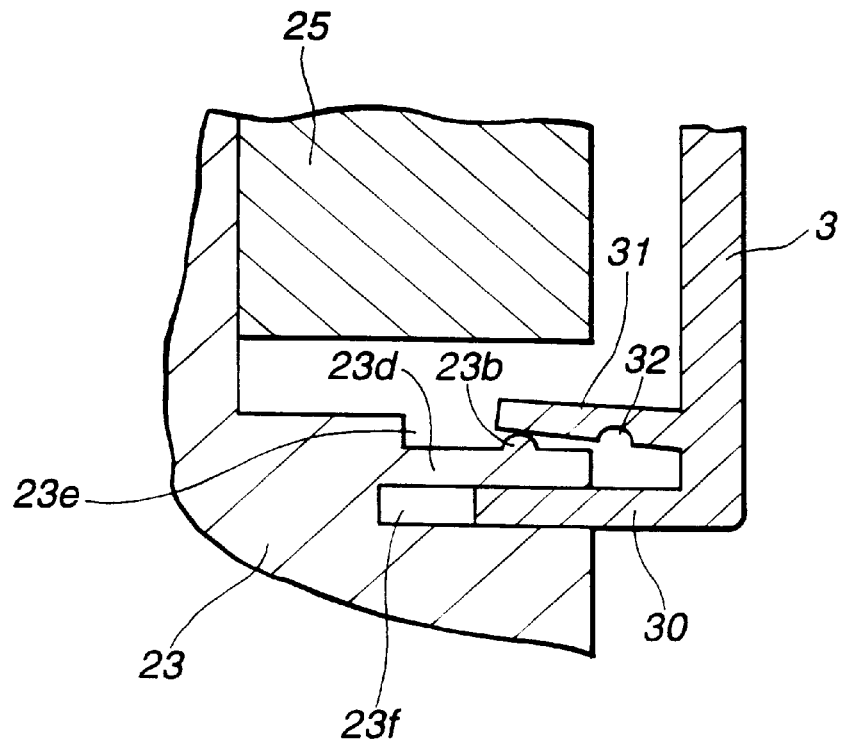
FIG. 21 is to illustrate how a mold is ejected from the molding die responsible for the formation of the cover member, and also forms a cross-section of an elasticity retaining rib piece of the cover member.

The aforementioned cover member 3 is molded with a molding die as shown in FIGS. 20 and 21, but the die has no under-cut at a position corresponding to the holding rib wall 16 of the light transmitting member 20. The molding die consists of a core die 23, a cavity die not illustrated here to contact with, or detach from, the core die 23, and a sliding die 25 which is incorporated in the core die 23 and slides laterally or in a direction normal to the direction in which the mold is displaced to be removed from the molding die. The molding die, when these die components are put together with their parting surfaces being in close contact, forms a cavity, into which a resin melt is injected from a gate not illustrated here and prepared on the cavity core until the resin fills the cavity.

With the molding die, after a predetermined cooling time, as shown in FIGS. 20 and 21, the sliding die 25 slides with respect to the core die 23, to release the bond between the core die 23 and cavity die. With the molding die, when the die components are released from bonding, an ejecting pin is put into action, and a cover member 3 impressed onto the core die 23 is ejected.

With the molding die, as the holding rib wall 16 has its front and back surfaces generally flat as described above, the core die 23 is allowed to have one cavity 23b for the front panel and the other cavity 23c for the holding rib wall, which together form a groove with evenly flat surfaces and parallel to each other with a septum 23a in between, to mold the front panel 3a and holding rib wall 16, as shown in FIG. 20. Accordingly, of the cover member 3, the front panel 3a and holding rib wall 16 with evenly flat surfaces with respect to the direction towards which the die components are displaced for disintegration, can be smoothly removed from the core die 23 without suffering any deformation.

On the other hand, with the molding die, as the elasticity retaining rib wall 31 has an engaging concavity 32 on the surface facing the connecting wall section 30 as described above, the corresponding part 23d must have an under-cut structure. Namely, with the molding die, the core die 23 and sliding die 25 are combined to form a cavity 23e to mold the elasticity retaining rib piece 31, and a convexity 23b semicircular in profile to mold the engaging concavity 32 is formed on the part 23d as if to protrude into the cavity 23e. Incidentally, the part 23d also forms a cavity 23f corresponding to the connecting wall section 30.

The molding die forms a cavity by sliding the sliding die 25 with respect to the core die 25, and in this state, the cover member 3 is removed from the die. The elasticity retaining rib piece 31 is small in width and length as compared with the holding rib wall 16. Accordingly, as the elasticity retaining rib piece 31 can be easily bent laterally in the above-described cavity as shown in FIG. 21, it can be forcibly removed from the die. The elasticity retaining rib piece 31, because of having the structure as described above, does not give a notable resistance against the molding die, when it is removed from the latter, and hence it allows a high-precision molding without suffering any deformation and fracture.

As seen from above, the molding die molds the holding rib wall 16 to hold the light transmitting member 20 and the elasticity retaining rib piece 31 to press this light transmitting member 20 firmly against the front panel 3a separately in different places. Accordingly, for the cover member 3, the holding rib wall 16 and elasticity retaining rib piece 31 are molded highly precisely, and the holding rib wall 16 is allowed to maintain its mechanical strength. The cover member 3 thus allows the light transmitting member 20 to be firmly and precisely attached thereto.

Figure 22:
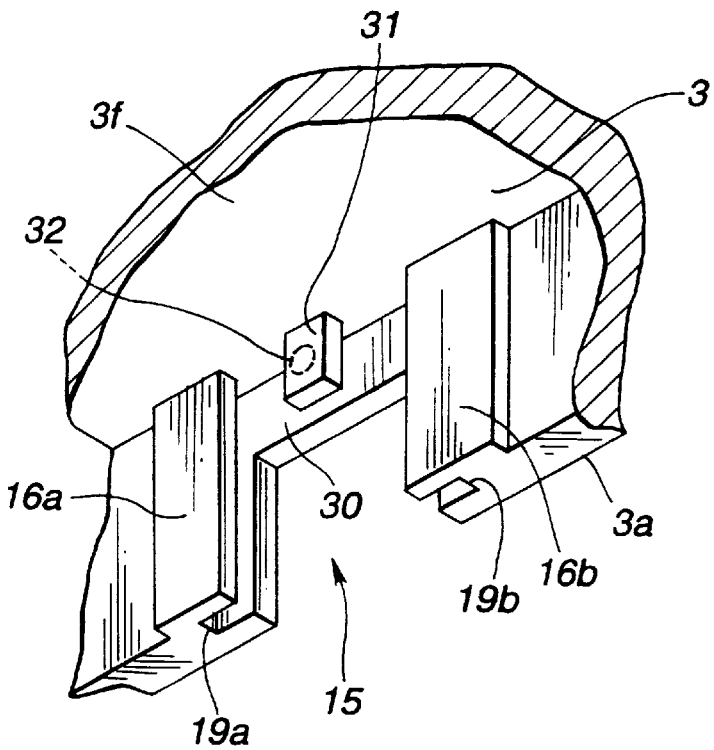
FIG. 22 is a disintegrated, perspective view of parts of interest of another tape position detecting section of the same data cartridge, to illustrate the constitution thereof.

The aforementioned cover member 3 has a pair of elasticity retaining rib pieces 31 formed on the inner surface of ceiling 3f right over the window 15. The elasticity retaining rib piece 31, however, is not limited to such positioning, but may be represented, for example, by one convex piece formed on, and integrally with, the inner surface of ceiling 3f at the center of the width of window 15 as shown in FIG. 22. Of course, the elasticity retaining rib piece 31 must have a height nearly the same with, or slightly smaller than, the height of the connecting wall section 30 and have a width slightly larger than the width of the elasticity retaining rib pieces 31a and 31b. Furthermore, the elasticity retaining rib piece 31 may consists of a plurality of pieces formed on the inner surface of ceiling 3f.

The elasticity retaining rib piece 31 includes a convex piece rectangular in profile facing, in parallel, the connecting wall section 30 or a part of the front panel 3a which remains after the window 15 has been cut from the cover member 3, and has a height nearly the same with that of the connecting wall section 30, and a front surface nearly flush with the front surfaces of the holding rib walls 16a and 16b. Further, the elasticity retaining rib piece 31 can deform in the direction of thickness depending on the property of its material. Furthermore, the elasticity retaining rib piece 31 has an engaging concavity 32 semicircular in profile formed on its front surface. To these engaging concavities 32, are fitted face to face the engaging convexities of the light transmitting member 20.

With the elasticity retaining rib piece 31, the interval D between its front surface and the inner surface of connecting wall section 30 is designed to have a smaller size than the groove width of the engaging grooves 19a and 19b, and hence it presses forward the light transmitting member 20 joined to the cover member 3. Incidentally, the elasticity retaining rib piece 31 is designed to have a thickness and size to produce a specified mechanical strength which is sufficient to give a forward pressure of 0 g/cm$^2$ to 500 g/cm$^2$ to the light transmitting member 20.

Figure 23:
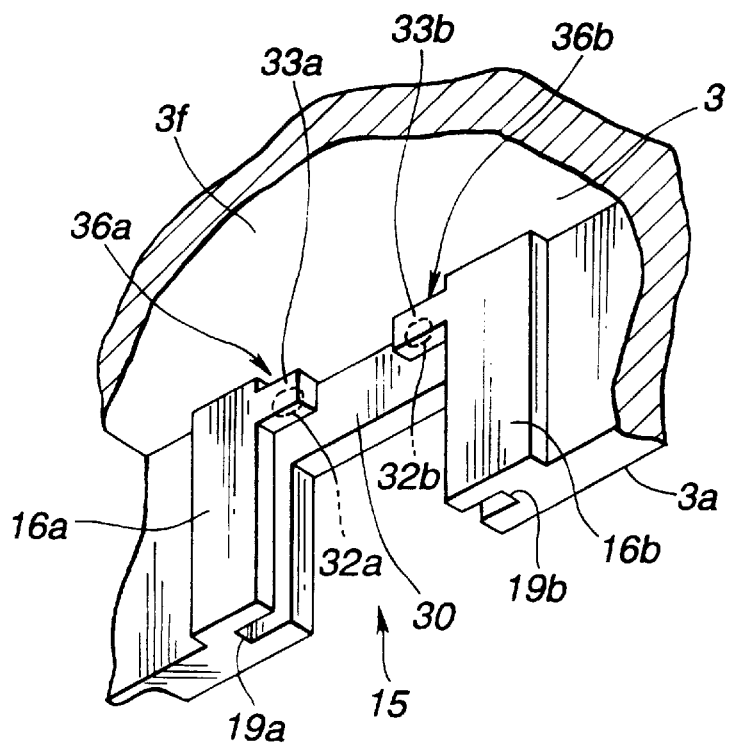
FIG. 23 is a disintegrated, perspective view of a still other tape position detecting section of the same data cartridge, to illustrate the constitution thereof.

Further, the cover member 3 may be molded so as to allow the elasticity retaining convex pieces 33a and 33b to protrude from, and integrally with, the holding rib walls 16a and 16b as shown in FIG. 23. Namely, these elasticity retaining convex pieces 33a and 33b protrude towards each other from, and integrally with, the lateral edges of the holding rib walls 16a and 16b, forming gaps 36a and 36b with the inner surface of ceiling 3f. Of course, these elasticity retaining convex pieces 33a and 33b protrude from the holding rib walls 16a and 16b such that they also face, in parallel, the connecting wall section 30 or a part which is left on the front panel 3a after the window 15 has been cut from the cover member 3.

Further, the elasticity retaining convex pieces 33a and 33b can undergo an elastic deformation in the direction of thickness, and have the engaging concavities 32a and 32b semicircular in profile on their front surface which fit face to face to the engaging convexities 22a and 22b of the light transmitting member 20. Furthermore, with the elasticity retaining rib pieces 32a and 32b, the interval D between their front surface and the inner surface of connecting wall section 30 is designed to have a smaller size than the groove width of the engaging grooves 19a and 19b, and hence they press forward the light transmitting member 20 joined with the cover member 3. Incidentally, the elasticity retaining rib pieces 33a and 33b are designed to have a thickness and size to produce a specified mechanical strength which is sufficient to obtain a forward pressure of 0 g/cm$^2$ to 500 g/cm$^2$ to the light transmitting member 20.

With the data cartridge 1 provided with the cover member 3 formed as above, the holding rib walls 16a and 16b, which are formed continuously on the inner surface of front panel 3a and of ceiling 3f to be given a mechanical strength sufficiently large to resist bending, are allowed to hold fast the light transmitting member 20, and the elasticity retaining convex pieces 33a and 33b, by undergoing elasticity deformation, press the light transmitting member 20 against the inner surface of front panel 3a which acts as a reference surface P. Accordingly, even if the data cartridge 1 is given a shock during a fall, these holding rib walls 16a and 16b will be relieved of bending, and thus the light transmitting member 20 attached to the window 15 will be safely prevented from falling. Further, as the light transmitting member 20 is properly placed with respect to the light receiving surface 14a of the light receiving element 14, the position or type of a tape can be securely detected.

Still further, when the data cartridge 1 is constructed such that the holding rib walls 16a and 16b are integrally molded with the elasticity retaining convex pieces 33a and 33b, the under-cut section of the molding die to mold the cover member 3 may be only of the parts to mold the small elasticity retaining convex pieces 33a and 33b, so that forcible removal of the holding rib walls 16a and 16b from the die can be dispensed with. In this case, with the data cartridge 1, the holding rib walls 16a and 16b need no notches which would be otherwise required, and thus the holding rib walls 16a and 16b will be able to maintain their mechanical strength as discussed above.

Figure 25:
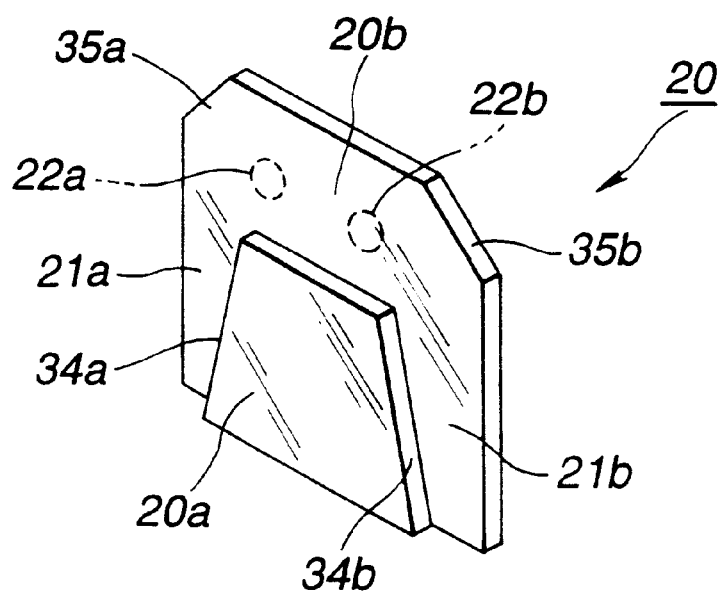
FIG. 25 is a perspective view of another light transmitting member of the same data cartridge.

As described above, in order to be easily assembled into the cover member 3, the light transmitting member 20 has its engaging sections 21a and 21b so constructed as to have a tapered structure such that their thickness vary in accordance with how deep the member is inserted, but their construction is not limited to this. For example, for the light transmitting member 20 shown in FIG. 25, the base section 20a has its lateral edges 34a and 34b so constructed that their width are increasingly reduced in the direction of insertion, that is, their lateral edges taper, or the base section takes the form of a trapezoid. In addition, for the light transmitting member 20, the engaging section 20b which is inserted into the engaging grooves 19a and 19b has its corners spanning from the upper end to lateral edges being rounded off to form cuts 35a and 35b there.

Of course, the light transmitting member 20 is made of a material such as a transparent polycarbonate resin or the like, and has the engaging section 20b so formed as to have a thickness nearly the same with that of the engaging grooves 19a and 19b. In addition, the light transmitting member 20 has the engaging concavities 22a and 22b semicircular in profile on, and integrally with, the principal surface of the engaging section 20b which fit face to face to the engaging convexities 32a and 32b formed on the elasticity retaining rib pieces 31a and 31b on the side of cover member 3. Incidentally, the engaging section 20b may have the same thickness in its whole expanse, but, like the light transmitting member 20 discussed above, it may be so constructed as to allow its thickness to enlarge increasingly in the direction of insertion.

Figure 24:
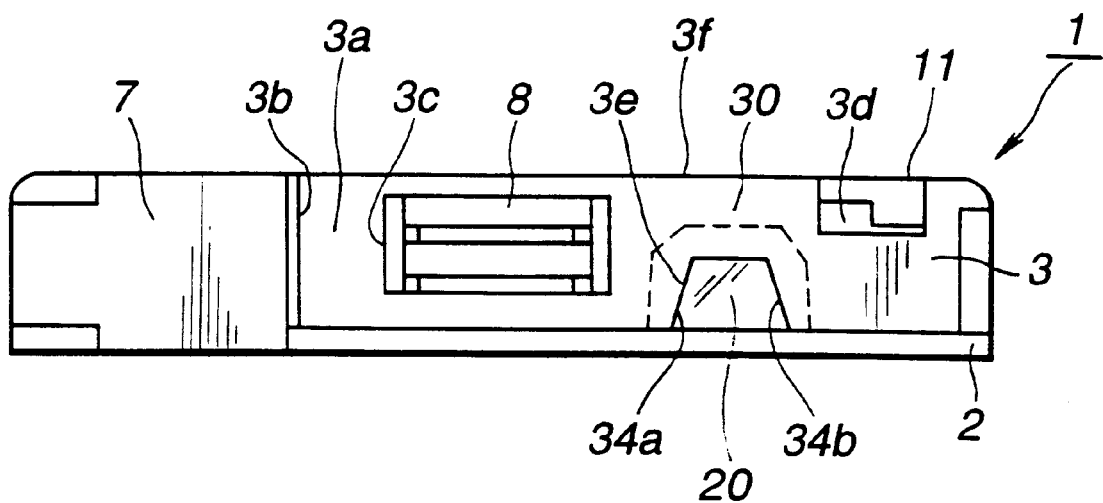
FIG. 24 is a frontal view of the data cartridge incorporating a light transmitting member.

The cover member 3, as shown in FIG. 24, is constructed such that the window 15 has a trapezoidal form to fit to the base section 20a in order to receive the aforementioned light transmitting member 20. Of course, the cover member 3 is made so large that the contour of the window 15 is sufficiently large to freely transmit the detection light beam to the light receiving element 14 placed right opposite thereto. The cover member 3, though not illustrated in the figure, is also provided, on the inner surface of front panel 3a and along both lateral edges of window 15, with the holding rib walls 16 and the elasticity retaining rib pieces 31a and 31b.

With the light transmitting member 20, as the engaging section 20b has cuts 35a and 35b spanning between the upper end and lateral edges, it becomes easy for the section to achieve a joint with the engaging grooves 19a and 19b of cover member 3, and thus the engaging section 20b is smoothly inserted through the engaging grooves 19a and 19b until it reaches the inner surface of ceiling 3f.

Accordingly, the light transmitting member 20 will be free from such phenomena as stoppage midway during insertion which, if not corrected, would lead to the incomplete closure of the window 15 by the principal surface 20a. Thus, the light transmitting member 20 is safely and properly connected to the cover member 3.

Additionally, with the data cartridge 1 described above, the elasticity retaining rib pieces 31 on the cover member 3 are allowed to have semicircular engaging concavities 32 while the light transmitting member 20 is allowed to have semicircular engaging convexities 22. But, the elasticity retaining rib pieces 31 may have engaging convexities while the light transmitting member 20 may have engaging concavities 32. Further, the shape of the engaging convexities and concavities is not limited to semicircles.

As detailed above, the recording medium cartridge of this invention is provided with holding rib walls which run continuously along both lateral edges of a window prepared on the front panel of a cover member and along the inner surface of the front panel and the inner surface of ceiling, and elasticity retaining rib pieces placed close to the window, to safely hold a light transmitting member. Thus, even if it is given a shock during a fall, a problem such as fall of the light transmitting member can be safely prevented. Further, an aberrant shift of light axis does not occur between the light transmitting member and a light receiving means to receive a detection light beam, and thus detection of the position and type of tape is securely achieved. Furthermore, with this recording medium cartridge device, an insertion guide structure applied to the light transmitting member not only facilitates attachment thereof to the cover member but also enables a high precision assembly. Still further, this recording medium cartridge device makes it possible for a molding die to have a simplified structure for molding the cover member, and thus allows a high precision molding, while maintaining productivity.

What is claimed is:

1. A recording medium cartridge device comprising:

a base plate, a cover member formed of an opaque synthetic resin and having a window on a front panel thereof and having a pair of lateral edges, with said joined cover member and said base plate forming a cartridge body for accommodating a recording medium, a light transmitting member made of a light transmitting material which is attached to the window to form an optical detection section, and a reflective member fixed to the base plate; and wherein a detection light beam radiated from a light emitting element placed close to a lower surface of said base plate is reflected by said reflective member and guided to said recording medium through said light transmitting member to be incident upon a light receiving element placed close to a front panel of said cover member so as to define detection means for detecting the position of said recording medium; and wherein said cover member further includes;

holding rib walls which run continuously along both lateral edges of said window, an inner surface of said front panel and a ceiling surface of said cover member, and form, with said inner surface of said front panel grooves joining both lateral edges of said light transmitting member; and an elasticity retaining rib piece which presses said light transmitting member which is placed close to said window against said inner surface of said front panel to be attached thereto to be aligned with said window to act as a reference surface to determine the position of said light transmitting member relative to said light receiving element.

2. A recording medium cartridge device as defined in claim 1 wherein said elasticity retaining rib piece has an engaging concavity to fit face-to-face to an engaging convexity formed on a principal surface of said light transmitting member.

3. A recording medium cartridge device as defined in claim 1 wherein said elasticity retaining rib piece protrudes from, and is integrally formed with, the inner surface of said ceiling surface of said cover member close to said window and independent of said holding rib wall.

4. A recording medium cartridge device as defined in claim 1 wherein said elasticity retaining rib piece protrudes from, and is integrally formed with, a lateral edge of said holding rib wall close to said window.

5. A recording medium cartridge device as defined in claim 1 wherein:

said light transmitting member comprises a base plate section which is fitted to said window formed on said cover member, and an engaging section which is integrally formed with said base plate section, and said light transmitting member has a pair of side edges with are formed so as to fit within said grooves formed between said holding rib walls on said cover member and the inner surface of said front panel; and when said engaging section is pressed by said elasticity retaining rib piece against the inner surface of said front panel, said base plate section of said light transmitting member is parallel to said light receiving element of said detection means.

6. A recording medium cartridge device as defined in claim 1 wherein an insertion guide means is integrally provided with said light transmitting member when said light transmitting member is inserted into engaging grooves of said cover member.

7. A recording medium cartridge device as defined in claim 1 which is characterized in that said insertion guide means is tapered being thinner than said grooves.

8. A recording medium cartridge device as defined in claim 1 wherein said insertion guide means comprises a cut formed along a peripheral surface of said engaging section which is to fit to said engaging grooves of said cover member.

9. A recording medium cartridge device as defined in claim 1 wherein said engaging groove of said cover member has a groove width A, the engaging side of said light transmitting member has a thickness B and a thickness C on the opposite side thereof, and the interval D between said elasticity retaining rib piece and the inner surface of the front panel of said cover member are so designed as to satisfy the relationship:

$A \geq C > B$, $A > D$, and $B \geq D$, and when said light transmitting member is attached to said cover member, said elasticity retaining rib piece undergoes an elasticity displacement caused by said light transmitting member, and presses said light transmitting member against said reference surface to achieve alignment thereof.

* * * * *